United States Patent [19]

Bushaw et al.

[11] 4,408,231

[45] Oct. 4, 1983

[54] METHOD AND APPARATUS FOR CALIBRATING A LINEAR ARRAY SCANNING SYSTEM

[75] Inventors: Kenneth A. Bushaw, Longmont; Ronald D. Gillingham, Berthoud; Gary W. Jorgenson; Clyde L. Manning, both of Longmont; Michael A. Steffes, Louisville, all of Colo.

[73] Assignee: International Business Machines Corporation, Armonk, N.Y.

[21] Appl. No.: 288,721

[22] Filed: Jul. 31, 1981

[51] Int. Cl.³ .............................................. H04N 1/40
[52] U.S. Cl. .................................. 358/280; 358/282; 382/50
[58] Field of Search ...................... 358/280, 282, 256; 340/146.3 AG

[56] References Cited

U.S. PATENT DOCUMENTS

| | | | |
|---|---|---|---|
| 3,018,331 | 1/1962 | McConnell | 358/282 |
| 3,433,026 | 5/1969 | Townsend | 178/7.2 |
| 3,568,151 | 3/1971 | Majima | 358/282 |
| 4,045,816 | 8/1977 | Cave | 358/212 |
| 4,133,008 | 1/1979 | Tisue | 358/282 |
| 4,174,528 | 11/1979 | White | 358/280 |
| 4,176,379 | 11/1979 | Wessler et al. | 358/280 |
| 4,216,503 | 8/1980 | Wiggins | 358/280 |
| 4,329,717 | 5/1982 | Logie et al. | 358/282 |

OTHER PUBLICATIONS

Bassetti et al., "Illumination Regulation for Array Scanner", IBM Technical Discl. Bul., vol. 22, No. 8, Jan.-1980.
D. G. Smith, Jr., "Reflective Document Detector", IBM Tech. Discl. Bul., vol. 23, No 1, 6-80.

*Primary Examiner*—Robert L. Griffin
*Assistant Examiner*—Edward L. Coles
*Attorney, Agent, or Firm*—Homer L. Knearl

[57] ABSTRACT

A linear image sensor and the video channel associated with the sensor are calibrated to maximize the video signal available. The sensor is limited in output by saturation of the CCD analog shift registers in the sensor. The channel is limited by the range of the analog-to-digital converter in the channel. The useable video signal is maximized by calibrating the sensor relative to its saturation condition and by adjusting the gain of the video channel relative to the range of the analog-to-digital converter. The sensor is calibrated by adjusting its exposure to illumination. The adjustment may be made by adjusting the illumination source or by changing the sampling interval for the sensor. The gain is adjusted by using a variable gain amplifier. A microprocessor monitors the digitized video signal and controls the exposure and gain to calibrate the sensor and channel.

20 Claims, 6 Drawing Figures

METHOD AND APPARATUS FOR CALIBRATING A LINEAR ARRAY SCANNING SYSTEM

FIELD OF THE INVENTION

This invention relates to calibrating a photosensitive scanning array and its analog video channel before the analog signal is digitized or otherwise processed. More particularly, the invention relates to calibrating the light illumination used with the scanning array and the gain of a video signal amplifier amplifying the signal from the array.

BACKGROUND OF THE INVENTION

The invention is useful in array scanners for facsimile systems or optical character recognition systems. Such scanners are usually calibrated by adjusting the lamp illumination or the gain of the video signal amplifier relative to a reference level indicated by a predetermined voltage.

One example of an array calibration system is shown in an article in the IBM Technical Disclosure Bulletin (Volume 22, No. 8A, January 1980, pp. 3131–3132) entitled Illumination Regulation For Array Scanner by Bassetti et al. This article describes adjusting the video signal from the scanner to a white reference level defined by a reference voltage. This is accomplished in either of two ways. The scanner scans a white reference. Then the video signal is adjusted by changing the lamp intensity or the sampling interval for the photosensors until the signal equals the reference voltage.

U.S. Pat. No. 4,136,277 entitled Exposure Control System for a Document Copying Machine and issued to J. A. Gerrard is another example of an illumination calibration system. Light reflected from the document being copied is sensed by a single photodetector. The lamp intensity is adjusted until the photodetector signal matches a predetermined signal level defined by a reference voltage.

A little more complex illumination control system is taught in FIGS. 15 and 18 of U.S. Pat. No. 4,153,364 entitled Exposure and Development Control Apparatus for Electrostatic Copying Machine issued to K. Suzuki et al. In FIG. 15, the lamp intensity is regulated relative to a reference voltage. In FIG. 18, the lamp intensity is regulated by a central processing unit that computes the required illumination intensity and generates a signal to control the lamp intensity.

A slightly different illumination calibration system is shown in U.S. Pat. No. 4,133,008 entitled Automatic Illumination Compensation Circuit issued to J. G. Tisue. The Tisue patent teaches adjusting the gain of the analog video amplifier connected to the scanner rather than adjusting the lamp intensity. The adjusted video signal is referenced to a predetermined voltage representative of a white reference video level.

One problem with all of the prior systems is that they calibrate the illumination relative to a fixed reference voltage. They do not maximize the signal output from the scanner or the video amplifier connected to the scanner relative to the maximum signal range of the scanner or the video channel. Further, if per chance the reference voltage happened to correspond to a maximum signal range for the scanner, the reference voltage is not readjusted if the scanner degrades or the photosensor array is replaced. This is a significant problem as scanners are susceptible to aging and contamination, and photosensor arrays vary widely in their signal output levels from array to array.

SUMMARY OF THE INVENTION

This invention has solved the above problems by using a microprocessor in a lamp calibration loop to optimize the illumination level used by the scanning array and the signal level of the video signal. The illumination is increased in digital increments by the microprocessor while the scanner scans a white reference strip. When the array saturates, the microprocessor sets the illumination level a predetermined percentage below saturation of the array. Alternatively, the microprocessor could change the sampling interval for the photosensors in the array until the array saturates. After saturation the microprocessor would set the sampling interval at a predetermined percentage of the saturation sampling interval.

After the illumination applied to the photosensor array has been adjusted for maximum video signal range, the microprocessor adjusts the gain of the video signal amplifier. The gain is set to produce a white level signal that is a predetermined percentage of the maximum swing available in the analog-to-digital converter in the video channel. Thus, the video signal from the array is first referenced relative to the saturation point of the array, and thereafter amplification of the video signal is set for maximum range of the A/D converter in the video channel.

One advantage of this invention is that the video signal from the scanner is calibrated relative to the maximum signal level available from the scanner's photosensor array so as to always maximize the video signal range available from the scanner. Another advantage of this invention is that the video signal is calibrated relative to the maximum video signal level that can be processed in the channel.

DETAILED DESCRIPTION

Figure 1:
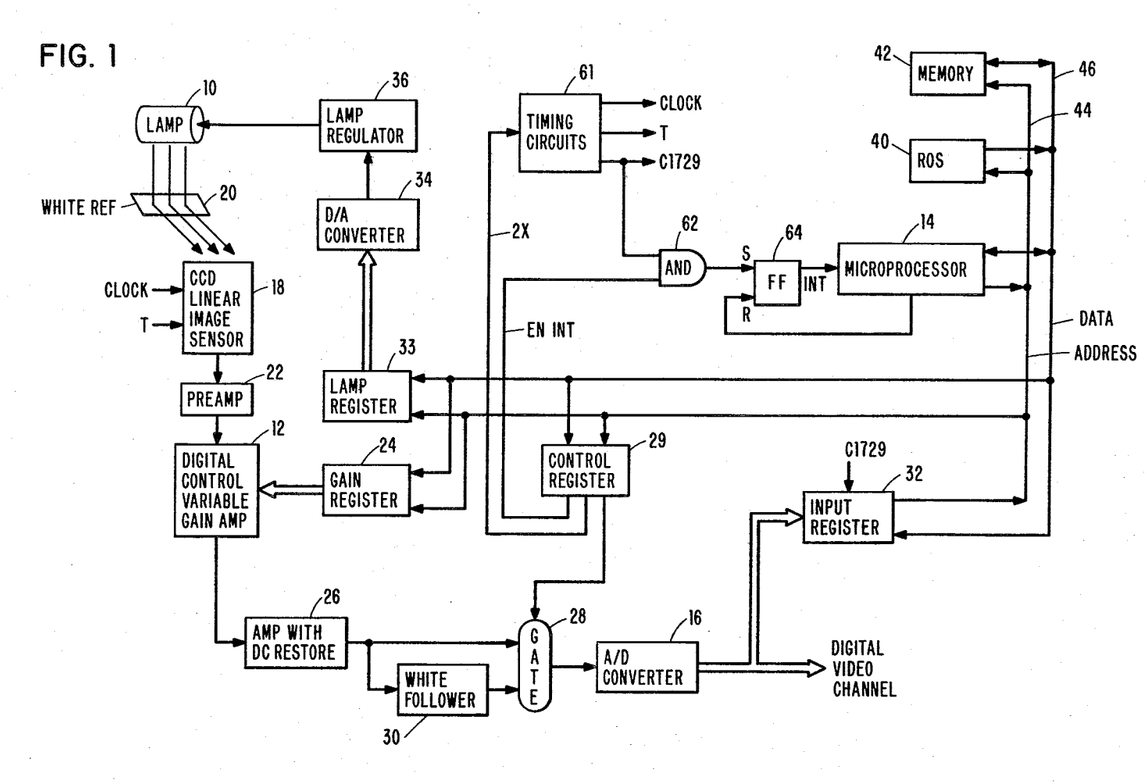
FIG. 1 shows the preferred embodiment of the invention where the scanner calibration is accomplished by the microprocessor controlling the lamp intensity and the gain of the video signal amplifier based on the maximum range of operation of the sensor array and the A/D converter.

FIG. 1 shows the preferred embodiment of the invention. The intensity of lamp 10 and the gain of variable gain amplifier 12 are controlled by a microprocessor 14. Microprocessor 14 monitors the video signal after it has been digitized by A to D convertor 16. The calibration of the lamp 10 and the variable gain amplifier 12 takes place while the CCD linear image sensor 18 is sensing reflected light from a white reference strip 20. The optics of the scanning system direct light from lamp 10 to reference strip 20 and then to the sensor 18. The optics can take any number of forms and are not disclosed herein.

Sensor 18 is a CCD linear array sensor containing 1728 useable photosensitive elements. Such a sensor array is available from Fairchild Camera and Instrument Corporation as the CCD 122 Linear Image Sensor. The output from this sensor is a series of analog signal levels with each time segment of the serial signal representing the output video analog level from one of the photo sensors on the CCD array. From sensor 18 the time segmented analog video signal is amplified by a preamplifier 22 and passed to the digital-control variable gain amplifier 12.

The digital-control variable gain amplifier 12 has its gain set by a digital word from microprocessor 14 via gain register 24. The amplified video signal is then passed to another amplifier 26 which restores the DC level of the video signal to a predetermined level. The predetermined level is the zero input level of the analog-to-digital (A/D) converter 16. This is one factor in insuring that the maximum range of A/D convertor 16 will be available to digitize the amplified video signal.

In normal video scanning operations, the amplified video signal from DC restore 26 is passed by gate 28 directly to the A/D convertor 16. The digitized video signal is passed on to the digital portion of the video channel. Gate 28 is controlled by microprocessor 14 via control register 29. The microprocessor selects whether the video signal or a signal level from white follower circuit 30 is to be digitized by placing a control bit in register 29.

During calibration, gate 28 is set to pass the maximum white signal level detected by white follower 30 to the A/D convertor 16. White follower 30 monitors the amplified video signal from DC restore 26 and stores the maximum white level from the time segmented video signal. As will be explained hereinafter, the white peak is used during the lamp calibration and the calibration of the variable gain amplifier 12. The white peak signal after it is digitized by A/D convertor 16 is passed to the microprocessor 14 via the input register 32.

To control the lamp intensity, microprocessor 14 generates a digital word and passes it to digital-to-analog converter (DAC) 34 via lamp register 33. DAC 34 generates an analog signal used to drive lamp regulator 36. Lamp regulator 36 then controls the intensity of lamp 10.

Lamp intensity is regulated relative to the signal saturation level of the CCD in linear image sensor 18. To do this microprocessor 14 must detect saturation of the linear image sensor 18. Microprocessor 14 compares the digitized video signal from A/D converter 16 and generates an output when the signal level is greater than a predetermined value. As will be explained hereinafter, the comparison is made immediately after the analog signal from the last sensor in the array. The video signal at that time should be near zero. It will have a significant value only if the CCD in the linear image sensor 18 has saturated. Thus, this digital compare will only be satisfied if the array has been saturated.

Microprocessor 14 is of a conventional design. Its programs are stored in read only storage (ROS) 40. Working memory 42 is used by microprocessor 14 as read/write storage when executing the programs. Microprocessor 14 controls access to registers 24, 29, 32 and 33, ROS 40 and memory 42 via address channel 44. Data between the microprocessor and the registers, the ROS and the memory flows over data channel 46.

Figure 2:
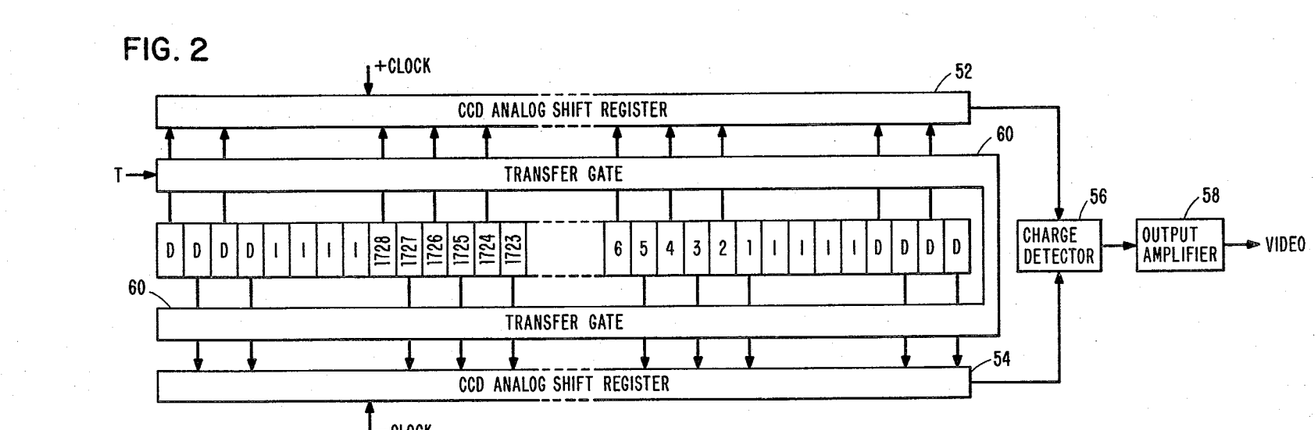
FIG. 2 is a schematic block diagram of the CCD Linear Image Sensor 18 in FIG. 1.

Before going through the operation of the preferred embodiment of the invention in FIG. 1, it is helpful to understand the nature of the sensor 18 and the video and timing signals associated with sensor 18. A simplified diagram of the Fairchild CCD 122 is shown in FIG. 2. The video signal and associated timing signals are shown in FIG. 3.

In FIG. 2, the array of photosensitive cells 50 is configured from right to left as four dark reference cells, four isolation cells, 1728 video cells, four isolation cells and four dark reference cells. The dark reference cells are covered by opaque material but are connected to the CCD analog shift registers 52 and 54. The isolation cells have no output as they are not connected to the CCD analog shift registers. Cells 1 to 1728 are the video sensors and provide the video analog signals which are transferred to the CCD analog shift registers and thereafter serially shifted out to the charge detector 56 and output amplifier 58.

The analog shift registers 52 and 54 are CCD devices. A CCD device is similar to a bucket brigade. Each cell or bucket in the analog shift register is filled to some charge level. When a shift signal occurs, the charge level from one bucket is shifted to the next bucket. The rightmost charged coupled device passes its charge level to charge detector 56. The charge detector 56 converts each received charge level into an analog signal level which is amplified by amplifier 58.

Figure 3:
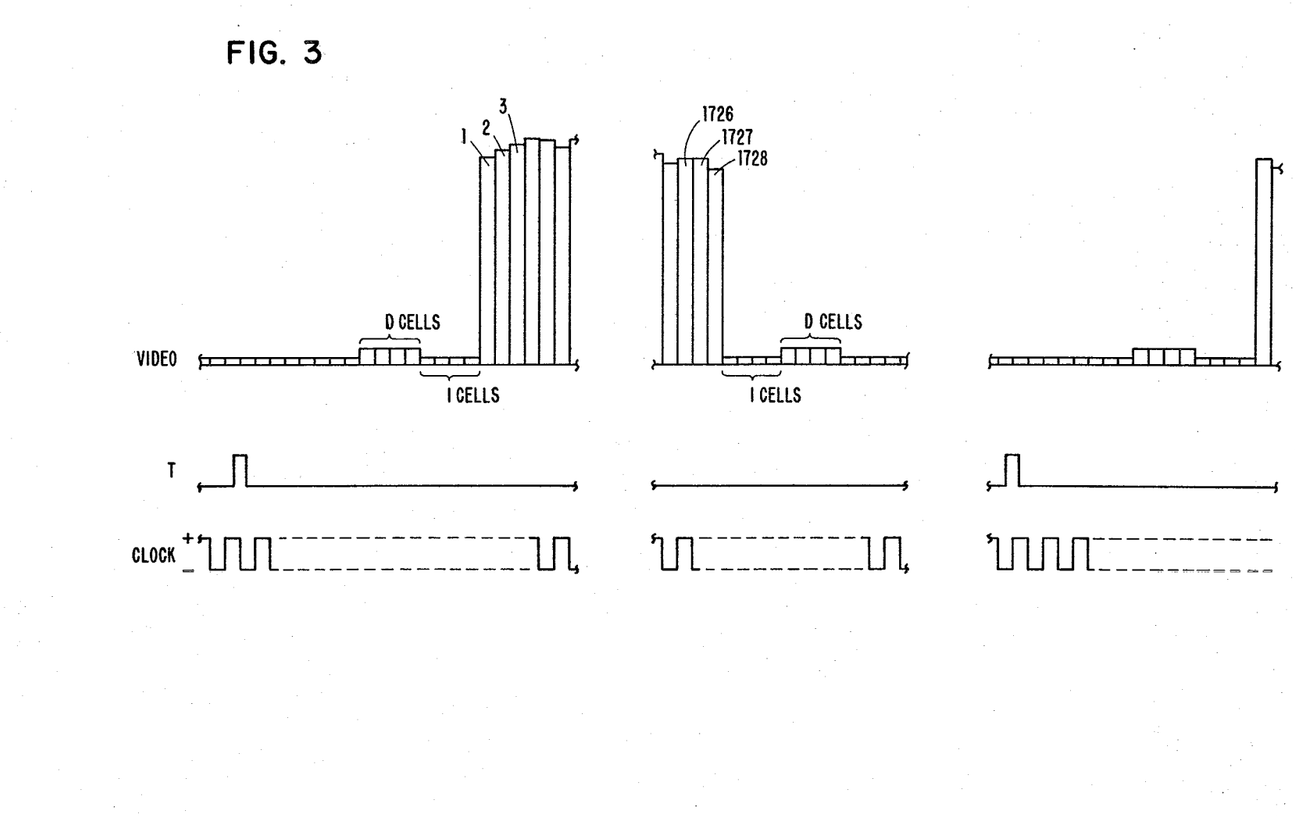
FIG. 3 shows the video signal and the timing signals for the sensor shown in FIG. 2.

FIG. 3 shows a typical video signal and the timing signals for the sensor array of FIG. 2. As the photocells 50 are illuminated they build up charge. When a transfer pulse T occurs, the transfer gate 60 passes the charge from each cell 50 to an associated cell in one of the analog shift registers 52 or 54. As shown in FIG. 2, the odd numbered photocells have their charge passed to analog shift register 54 while the even numbered cells 50 have their charge passed to the analog shift register 52.

The analog shift registers 52 and 54 are clocked 180 degrees out-of-phase by the clock (CLOCK) signal in FIG. 3. The transfer pulse T brackets one of the negative transitions of the clock signal. Four clock cycles later (eight half clock cycles) the first dark reference level is shifted out of shift register 54 to the charge detector 56 and converted to an analog level. Thereafter, the analog shift registers 52 and 54 on alternate half cycles pass a charge signal to charge detector 56. The result is the video signal shown in FIG. 3 which consists of four dark reference levels (from D cells) followed by four isolation levels (from I cells), 1728 video levels, four more isolation levels and four dark reference levels. After the last four dark reference levels, the video signal will stay low.

The clock signal continues to shift charge levels out of the analog shift registers. However, the shift registers will not contain any information until the next transfer pulse is present. The period between transfer pulses is chosen to allow sufficient exposure of video cells 1–1728 so that they build up charge. An exposure time of about eight to ten milliseconds has been used, but of course this is dependent upon the illumination intensity of lamp 10. When the transfer pulse T occurs again, the video data gating operation repeats as shown in FIG. 3.

Figure 4:
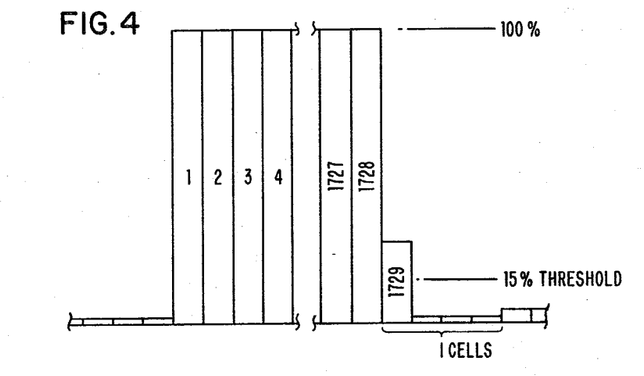
FIG. 4 shows the video signal when the CCD analog shift registers of FIG. 2 saturate.

When the CCDs in the linear image sensor 18 saturate, the video signal from the sensor appears as shown in FIG. 4. All of the analog signal levels from the video cells 1–1728 are substantially at the same level, the 100% or saturated level. The first isolation cell after the video cells, also referred to as cell 1729, also contains an analog signal level. The existance of a signal level in cell 1729 is an indication of saturation.

The saturation of CCD's in sensor 18 occurs in the following manner. The photo cells 50 (FIG. 2) will transfer charge to the CCDs in proportion to the illumination they detect. If that transferred charge is greater than the CCD cells can pass to each other in their bucket brigade shifting operation, then a residual charge is left behind. So long as all of the CCD cells or buckets are filled, the residual charge stays in place. However, when the first isolation cell comes along after the video cells, it picks up and carries with it the residual charges from all the video cells. Accordingly, when the time slot for the first isolation cell, cell 1729, is read out of sensor 18, a significant analog signal level on this time slot will indicate that the CCD's and thus sensor 18 has been saturated. As shown in FIG. 4, a threshold level of 15% relative to the saturation level of the video cells has been selected for cell 1729 as indicating saturation of sensor 18.

In FIG. 1, the timing circuits 61 generate the clock signal and transfer pulse T used by the linear image sensor 18 to gate out analog video signal. Timing circuits 61 also generate the C1729 timing pulse corresponding to the first isolation cell following the video cells, the 1729 cell. This C1729 signal is used to generate a C1729 interrupt signal for microprocessor 14.

The C1729 interrupt is used by microprocessor 14 to control when to check input register 32 for array saturation. Also, the C1729 pulse from the timing circuit 61 is used to gate the digital signal for the 1729 cell from the A-D converter 16 into the input register 32.

The C1729 interrupt is generated by AND 62 and flip-flop 64. When the microprocessor 14 wishes to enable the interrupt, it sets a bit in control register 29. This enable-interrupt bit in control register 29 enables AND 62. When the next C1729 timing signal occurs after the enable-interrupt, AND 62 will pass it to flip-flop 64 to set the interrupt condition. After microprocessor 14 detects the C1729 interrupt, it resets flip-flop 64.

Microprocessor 14 can also control the time between transfer pulses T generated by timing circuits 61. By changing this time interval the exposure time for photocells 50 (FIG. 2) may be changed. Microprocessor can set a "2X" bit in control register 29. This 2X bit signals the timing circuits 61 to double the time interval between transfer pulses T.

OPERATION

To optimize the video signal to the operating range of sensor 18 and the operating range of the A-D converter 16, microprocessor 14 controls the system of FIG. 1 in the following manner. First, the microprocessor controls the intensity of lamp 10 to bring the image sensor 18 to the saturation point. With the video signal at the saturation level, processor 14 controls the digital variable gain amplifier to adjust the 100% video signal to 100% range of the A-D converter 16. After both the lamp intensity and gain have been adjusted for maximum signal range in the analog portion of the video channel, the microprocessor adjusts the lamp intensity down to a point where the video signal is near 70% of the maximum. Then the system is fine tuned to this 70% operating point by adjusting the gain in amplifier 12 so that the video signal out of A-D converter 16 is as close as possible to 70% of maximum.

The 70% operating point is selected to guarantee that no white video level will ever saturate a CCD cell or exceed the range of the A-D converter. Video cell non-uniformities, temperature drift and tolerances in the circuit components can all cause the white signal from the video signal to be higher than expected. By selecting the 70% operating point, no white cell will ever exceed the 100% or saturation point in the array or exceed the range of the A-D converter.

Following in flow chart form are the step by step instructions used by the microprocessor 14 to calibrate the analog portion of the video channel relative to the sensor array saturation and the range of the A-D converter. Each of the program routines will be described relative to FIG. 1.

-continued

Array Saturate Set

DISABLE C1729 INTERRUPTS
END

Array Saturate Set is the first routine and begins by setting the gain DAC value and the lamp DAC value to zero. A zero value corresponds to minimum gain and minimum lamp intensity; it does not mean the gain is zero or the lamp is off. Microprocessor 14 establishes minimum gain and lamp settings by loading zeros into registers 24 and 33 respectively. After these values are loaded, the processor waits 200 milliseconds to allow lamp 10 to settle.

Next, control register 29 is set up so that the microprocessor may monitor for saturation. This is accomplished by the miscroprocessor loading a bit into control register 29 that will enable gate 28 to pass the signals from amplifier 26 directly to A-D converter 16. In other words, the microprocessor wishes to check the value of a particular cell, the 1729 cell, rather than look at the maximum white value from white follower 30.

The routine then checks to determine if the 2× or double time-interval has been set for integration time by the sensor array 18. Normally it will not be set and the routine will branch to "Wait for C1729 interrupt." When the C1729 interrupt occurs, microprocessor 14 will read the input register 32 which has been loaded by the C1729 clock signal with the digital value of the 1729 cell (see FIG. 4). In the flow chart, this value is referred to as the saturation pel (where pel is picture element).

Microprocessor 14 compares the digital value of the saturation pel to the hexadecimal value 10 which corresponds to the 15% threshold. Since the lamp was set to minimum value or intensity, the saturation pel will be below threshold and the routine will branch to check that the lamp DAC value is less than the hexadecimal value 3F, which is the maximum lamp intensity. Thereafter, the routine will branch to the step of incrementing the hardware and software lamp DAC values.

The hardware lamp DAC value refers to the value in lamp register 33. The microprocessor also stores a software DAC value since it has no way to read the value in register 33. Thus, the microprocessor 14 reads the software DAC value it has stored, increments it by one and outputs that new DAC value as the hardware DAC value to lamp register 33. The processor than waits for eighteen C1729 interrupts to allow lamp 10 to again settle. Then the routine returns and proceeds through saturation pel check again.

Normally at some point the saturation pel will be greater than the hexadecimal value 10. In that event, program routine branches to disable the C1729 interrupts and Array Saturation Set is complete. The C1729 interrupts are disabled by microprocessor 14 changing the state of the enable-interrupt bit loaded into control register 29.

In the event that the lamp DAC value reaches the hexadecimal value 3F and the saturation pel is still below threshold (the array has not saturated), the array saturation routine then sets the 2× flag. At the same time that the processor sets the 2× flag, it also sets the hardware and software lamp DAC back to zero (minimum).

After the 2× flag is set and the lamp DAC is set back to minimum, the routine again waits for the lamp to settle. Then the routine branches back and checks that the 2× flag was set. Now with the 2× flag set, microprocessor 14 sets the 2× integration bit in control register 29. The 2× bit causes timing circuits 61 to double the time interval between transfer pulses T. The routine waits for the next C1729 pulse and resets the 2× bit. At the next C1729 interrupt, the routine checks the saturation pel to see if doubling integration time has caused the array to saturate. If it has not, then the hardware and software lamp DAC values are incremented by one and the routine again waits 18 interrupts to allow the lamp to settle.

The routine continues looping through in this manner, setting and resetting the 2× bit during each loop to double the integration time and incrementing the DAC values for the lamp until the saturation pel exceeds the 15% threshold (FIG. 4). Once the threshold is exceeded, then the array saturation routine disables the C1729 interrupts and ends. If even with the 2× integration mode set, the lamp DAC reaches the maximum hexadecimal value 3F without the saturation pel exceeding the threshold, the routine then sets the message "Unable to Saturate Array" and enters a scan abort routine not shown.

After the array saturation set routine has been satisfied, the light intensity from lamp 10 is such that sensor 18 is slightly over the 100% saturation point for the video cells 1–1728. In this condition the video signal will look substantially like FIG. 4. The microprocessor is now ready to begin the setting of the VGA 12 gain to maximum range of A-D converter 16. The VGA Gain Set routine is shown below.

The VGA Gain Set routine begins by microprocessor 14 again enabling the C1729 interrupts. After being enabled, the processor waits for the first such interrupt and then sets a bit into control register 29 to change gate 28. Gate 28 is set to pass the analog signal from white follower 30. Thus the signal digitized by converter 16 at C1729 time will be the maximum white level from the video cells 1-1728.

After gate 28 is switched, the microprocessor checks to see if the 2× flag is on. Normally this flag is not on and the routine branches to wait for the next C1729 interrupt. When that interrupt occurs, microprocessor 14 knows that input register 32 will contain a maximum white level from the video cells. The routine checks to see if this white follower value is less than hexadecimal value 7F. There are 128 levels in the A-D converter 16. Thus, the hexadecimal 7F. represents the maximum value available from A-D converter 16. Normally at the beginning of the gain set routine, the white follower value is less than 7F and the routine then branches to check the gain DAC value. Maximum gain DAC value is also 7F. Since the gain DAC was set to the minimum value, the routine branches to increment the hardware and software gain DAC values.

Microprocessor 14 tracks the gain of the amplifier 12 by storing a software gain DAC value at the same time it outputs a identical hardware gain DAC value to gain register 24. Thus, the incrementing operation is performed by microprocessor 14 by incrementing the software gain value and updating the hardware gain value in gain register 24. When the incrementing is complete, the routine branches back to check for the 2× flag and continues in this loop.

The loop is broken normally when the white follower value is no longer less than hexadecimal 7F. In other words, the white follower value is at maximum for the A-D converter 16. In that event, the gain set routine branches to check whether the gain DAC value is greater than zero. Normally, the gain DAC value is greater than zero and the microprocessor decrements the hardware and software gain DAC values by one. This returns the DAC value to the value just previous to where the gain caused the white follower to exceed the range of the A-D converter. If the gain DAC is not greater than zero, the gain DAC values are not decremented. This insures that a negative value is not inadvertently set into the gain DAC.

After the gain DAC value check and decrementing, the C1729 interrupt is disabled. The current lamp DAC value is stored by the processor as the "Last Lamp CAL" value, and the current gain DAC value is stored by the processor as the "Lamp CAL Gain" value. This is the normal end of the VGA Gain Set routine.

There are however, other paths in the gain set routine that are of interest. The section of the routine that utilizes the 2× flag operates in the same manner as in the Array Saturation Set routine. If the 2× flag is set during array saturation, 2× integration must also be used during gain set. In effect, if double time interval integration was required for array saturation then double time interval integration is used for the gain set operation.

The other portion of the gain set routine of interest is where the white follower value does not reach the maximum value for the A-D converter 16 before the gain DAC reaches maximum value of hexadecimal 7F. If this occurs, then the routine checks to see whether the white follower value is at least the hexadecimal value 7B. If it is, the routine accepts that as a usable gain setting and exits the routine in the normal way as previously described. However, if the white follower value is less than hexadecimal 7B, the scanner is not operable. Processor 14 then sets a message "Maximum Gain is too Little" and enters a scan abort routine not shown.

This completes the Array Saturation Set and VGA Gain Set routines. At this point the lamp value has been set so that the array is at saturation and the gain value has been set so that the maximum white level is very near the maximum value available from the analog to digital converter 16. In other words, the video signal from the array is at the 100% level, and the A-D converter is being operated at or near 100% of its range.

Microprocessor 14 will now begin the Normal Lamp Calibrate routine which will set the lamp intensity so that the video signal from the array is at the operating point of 70% of saturation. The Normal Lamp Calibrate routine is shown below.

Microprocessor 14 begins the Normal Lamp Calibrate routine by setting the gain DAC value to the Lamp CAL Gain value. Next, the routine initializes the going up, going down flags to zero. These flags are used subsequently in the routine. The C1729 interrupt is enabled by microprocessor 14 setting the enable interrupt control bit in control register 29 of FIG. 1. Similarly, microprocessor 14 sets up the white follower value as the sample data by loading a control bit in the control register 29 that gates the signal from white follower 30 to the A-D converter 16.

With the routine initialized, the microprocessor waits for the C1729 interrupt. When it occurs, the processor transfers a new white follower stored value to a previous white follower value stored location. The white follower and previous white follower stored values are kept by the processor. Each time through the loop, the processor will read in the white follower sample data to the new white follower storage location. Prior to doing that, the value in the new white follower storage must be transferred to the previous white follower storage location. The processor reads the white follower sample data from the input register 32 which was loaded at C1729 time.

If the new white follower value is equal to the hexadecimal value 59, which corresponds to the 70% operating point, then the routine branches to the exit point where it disables the C1729 interrupt and sets the Last Lamp CAL value to the lamp DAC value. Normally the new white follower value is not equal to hexadecimal 59, and the routine branches to check whether the new white follower value is greater than hexadecimal 59. If it is, then lamp CAL case 2 routine is used to continue the calibration. If it is not, lamp CAL case 1 is used to continue the calibration.

Lamp CAL case 2 is used where the white follower value is above the 70% operating point and the lamp DAC will be decremented to approach the operating point. Lamp CAL case 1 is used for the white follower value is below the 70% operating point and the lamp DAC will be incremented to approach the 70% operating point. Lamp CAL case 1 and 2 are shown below. These routines are substantially the same except for the direction that the white follower value is approaching the desired 70% operating point. The operation consists of using one of these routines until the 70% operating point is crossed and then branching to other routine until the operating point is crossed again. Then the case 1 or case 2 routine, whichever is branched to last, will select and set the lamp DAC value associated with the previous white follower value or the new white follower value. The lamp DAC value selected is the one that produced the white follower value closer to hexadecimal 59. The normal lamp calibrate routine then exists.

In the lamp CAL case 2 routine, the operation starts by setting the going down flag. It then checks to see if the going up flag has been previously set. If going up has been set, Cal case 1 has been used for the first approach to the 70% operating point, and a direction reversal has occurred. If the going up flag is not set, then the routine branches to check if the lamp DAC value is greater than zero, the minimum setting. If it is not greater than zero, this represents a condition where lamp DAC can't go any lower, so the message, "Lamp Lo Stop," is sent, and the exit condition is entered.

Normally, the lamp DAC is greater than zero, and microprocessor 14 decrements the hardware and software lamp DAC values and waits for 200 milliseconds for the lamp to settle. Then the routine loops all the way back to the normal lamp calibrate routine where a new white follower value is read at the next C1729 interrupt. This looping through the lamp calibrate routine and lamp CAL case 2 continues until the lamp calibrate routine detects that the white follower is less than hexadecimal value 59. This indicates the 70% operating point has been crossed, and the lamp calibrate routines switches to lamp CAL case 1 routine.

In the lamp CAL case 1 routine, the going up flag is set and microprocessor 14 checks to see if the going down flag is already set. Since the operating point was just crossed during the operation of lamp CAL case 2, the going down flag has been set. Case 1 will branch to the direction reversal path in its routine and checks to see if the previous white follower value is closer to hexadecimal 59 than the new white follower value. If it is not, the exit flag is set, and the lamp calibrate routine exits after disabling C1729 interrupt and storing the lamp DAC value as the Last Lamp CAL value.

If the previous white follower value is closer than the new white follower value, case 1 increments the hardware and software lamp DAC values which returns them to the same DAC values they were at for the previous white follower stored value. Then the previous white follower stored value is loaded into the new white follower stored location and the microprocessor waits for 200 milliseconds for the lamp to settle. After this the case 1 routine sets the exit flag and the normal lamp calibrate routine exits as before.

At this point the lamp intensity has been adjusted so that the video signal is near the 70% operating point for the array and is as close as possible to the 70% operating point for the A-D converter as adjusting the lamp can accomplish. To fine tune, microprocessor 14 can readjust the VGA gain setting. This is accomplished by the VGA Calibrate routine shown below.

VGA Calibrate

START
|
SET VGA GAIN DAC TO 'LAMP CAL GAIN'
RESET GOING UP & GOING DOWN FLAGS
ENABLE C1729 INTERRUPT
SETUP:
    WHITE FOLLOWER (WF) AS SAMPLED DATA WAIT FOR C1729 INTERRUPT
PREVIOUS WF ←—— NEW WF
READ THE SAMPLED DATA (WF)
SAVE IN NEW WF
IF THE NEW WF = x'59'

The VGA calibrate routine is substantially the same as the lamp calibrate routine and will not be described in detail. It differs only in that the gain DAC is being adjusted rather than the lamp DAC and further that it is not necessary to wait for any settling time after the gain DAC is adjusted. Also, the effect of the VGA gain on the video signal at A-D converter 16 is much finer than the relatively coarse effect of lamp adjustment on the digital value out of the A-D converter. Thus, the changes in digital value for each gain adjustment are much smaller. When the gain calibration is complete, the video signal will be very close to the 70% operating point.

While a 70% operating point was chosen for lamp intensity calibration, and a 70% operating point was chosen for maximum range of A-D converter, it will be appreciated by one skilled in the art that other operating points might be selected. Further, the operating point for lamp calibration relative to array saturation and for gain calibration relative to the A-D converter range need not be the same. One might select 70% for the lamp calibration and 80% or 85% for the gain calibration. In addition, the sequence of routines in which the calibration steps are performed might be varied. For example, instead of following the sequence of Array Saturation Set, VGA Gain Set, Normal Lamp Calibrate and VGA Calibrate, the sequence could be Array Saturation Set, Normal Lamp Calibrate, VGA Gain Set and VGA Calibrate. Also, Array Saturation Set and VGA Gain Set need only be used during initial power on. Thereafter to recalibrate, only the Normal Lamp Calibrate and VGA Calibrate routines would be necessary.

Figure 5:
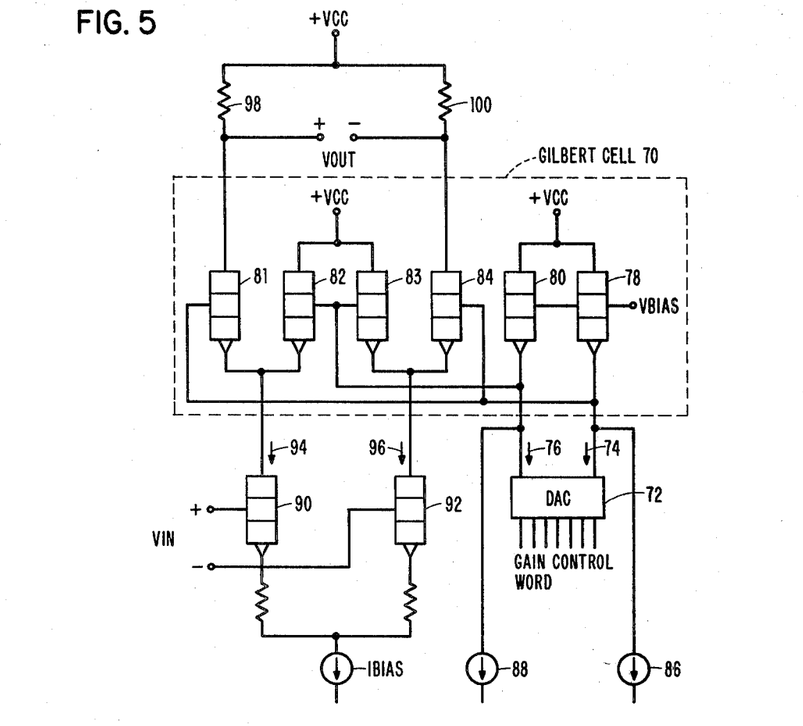
FIG. 5 shows the details of digitally controlled variable gain amplifier 12 of FIG. 1.

Referring now to FIG. 5, VGA 12 in FIG. 1 is shown in detail. The digitally controlled VGA includes a Gilbert Cell 70 with a digital/analog converter (DAC) 72 to control the gain between VIN and VOUT. A seven-bit binary word (gain value) is applied to DAC 72 from gain register 24 (FIG. 1) to generate reference currents varying in magnitude. These reference currents are used to change the current gain of the Gilbert Cell. The input voltage VIN is converted to a current which is multiplied by the Gilbert Cell and converted to the output voltage VOUT.

In operation, the gain word applied to DAC 10 controls the size of the currents 74 and 76 into the DAC. The sum of the current 74 and 76 in DAC 72 is equal to a constant. If the gain control word is all zeros, then current 76 is zero, and current 74 is maximum. Conversely, if the gain control word is all ones, then current 74 is zero, and current 76 is maximum. At the mid-point of the gain value or gain word, currents 74 and 76 are equal.

The currents 74 and 76 are converted to voltages by the base-to-emitter voltage drops across transistors 80 and 78. These voltages are applied to the bases of the transistors 81, 82, 83 and 84. Current sources 86 and 88 establish the upper and lower gain limits by preventing the current pulled on the emitters of transistors 78 and 80 from going to zero.

The input signal VIN is applied between the bases of transistors 90 and 92. The input voltage is then converted to a bipolar current difference between currents 94 and 96. These current signals are multiplied by the Gilbert Cell in accordance with the bias applied to the bases of transistors 81, 82, 83, and 84. If current 76 is larger than current 74, the base voltage on transistors 82 and 83 will be lower than the base voltage on transistors 81 and 84. Transistors 81 and 84 will carry a higher share of the bipolar current signal (currents 94 and 96) than transistors 82 and 83 will carry. The gain is, therefore, increased. If current 74 is larger than current 76, transistors 81 and 84 will have a lower share of the bipolar current signal, and the gain is decreased. The amplified bipolar current signal is converted to the voltage VOUT by the voltage drop across resistors 98 and 100.

Figure 6:
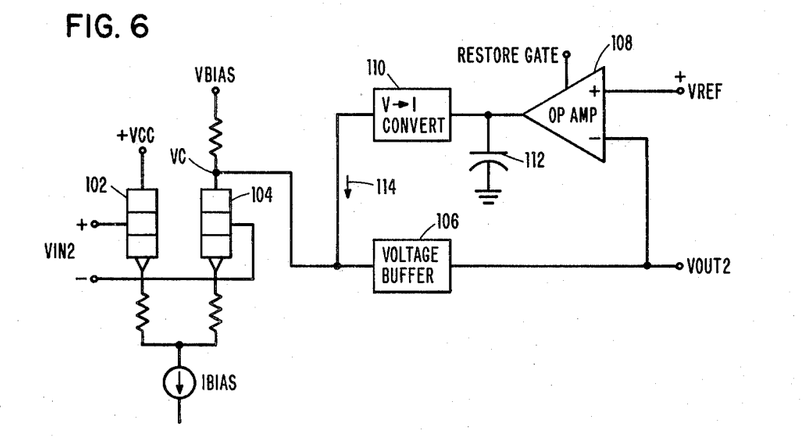
FIG. 6 shows the details of the differential amplifier 26 of FIG. 1 which has DC restore.

The signal VOUT from the VGA of FIG. 5 goes to the differential amplifier with DC restore (amplifier 26 of FIG. 1). The details of this amplifier are shown in FIG. 6. The signal VOUT from the VGA of FIG. 5 is the input signal VIN2 in FIG. 6 to transistors 102 and 104 which form the differential amplifier. The output of the differential amplifier is passed through a DC restore circuit consisting of voltage buffer 106, operational amplifier 108 and voltage-to-current converter 110. The DC restore circuit is controlled by a restore gate signal to restore the DC level of the output VOUT2 to a reference level.

The bipolar input signal VIN2 is amplified by the transistors 102 and 104 to provide an output VC. This output is passed through voltage buffer circuit 106 (emitter followers) to provide the amplifier output VOUT2. The DC level of this output can vary with time depending upon the environment of the circuit. For example, a change in temperature may cause the DC level in VC to shift.

To restore the DC level to a reference level, operational amplifier 108, capacitor 112 and voltage-to-current converter 110 are provided. When VIN2 has zero AC input, the DC level is restored by activating the restore gate signal on operational amplifier 108. The feedback loop formed by operational amplifier 108 through capacitor 112, converter 110 and voltage buffer 106 will force VOUT2 equal to VREF. Capacitor 112 will store whatever charge is necessary to provide a voltage to the converter 110 to make VOUT2 equal to VREF. When the restore gate signal is removed, capacitor 112 continues to hold this voltage and, thus, holds current 114 to a value such that the DC level of VOUT2 should equal VREF. Also, if the voltage drop across voltage buffer 106 is not a function of the current into the voltage buffer, then the DC level at VC is restored to a voltage relative to VREF. This is useful in preventing transistor 104 from saturating.

With VC and VOUT2 DC-restored and the restore gate signal off, the differential amplifier will operate on transient input signals relative to the restored DC level. After a preset period of time, when the transients in input signal VIN2 are not present, the restore gate signal is again present to correct for DC level shift in the differential amplifier since the last restore interval. In the present invention VREF is equal to ground or zero volts which is the base or reference voltage for A/D converter 16. The transfer timing pulse T can be used as the restore gate signal, but it must be stretched. The restore gate signal should sample five or more empty cells (cells with no video signal).

The details of VGA 12 and amplifier 26 have been described; however, it will be apparent to one skilled in the art that any number of VGA circuits and DC-restored amplifier circuits might be used. Likewise, there are many equivalent circuits and components available for any one of the functional blocks shown in FIG. 1.

While we have illustrated and described the preferred embodiments of our invention, it is understood that we do not limit ourselves to the precise constructions herein disclosed, and the right is reserved to all changes and modifications coming within the scope of the invention as defined in the appended claims.

What is claimed is:

1. In a scanning system having means for illuminating the area to be scanned and scanning means having an array of photosensors for scanning the illuminated area and generating a video signal time segmented into pel (picture element) intervals representative of the light reflected from picture elements (pels) of the illuminated area, the improvement comprising:
   means for monitoring at least one pel interval in the time segmented video signal to detect saturation of said scanning means;
   means for incrementing the intensity of illumination provided by said illuminating means until said monitor means detects said scanning means has saturated; and
   means responsive to scanner saturation detection by said monitor means for decrementing the intensity of illumination provided by said illuminating means to a predetermined proportion of the saturation intensity.

2. The apparatus of caim 1 wherein said monitor means comprises:
   means for sampling the time segmented video signal during a saturation pel interval in the signal;
   means for detecting when the signal level from said saturation pel interval exceeds a predetermined level indicating said scanning means has saturated.

3. The apparatus of claim 1 and in addition:
   means for digitizing each pel interval of the time segmented video signal from the scanning means;
   means for amplifying the video signal before the signal is digitized by said digitizing means;
   second monitor means for monitoring the digitized video signal to detect when the range of said digitizing means is exceeded;
   means responsive to range-exceeded detection by said second monitor means for adjusting the gain of said amplifying means to set the maximum level of the amplified video signal to a predetermined percentage of the range of said digitizing means.

4. The apparatus of claim 3 wherein said second monitor means comprises:
   means for following the maximum video signal level from said scanning means and storing a follower level representative of the maximum video signal level in a given time interval;
   means for gating the follower level to said digitizing means;
   means for detecting when the digitized follower level reaches the maximum digital value available from said digitizing means.

5. The apparatus of claim 4 wherein said adjusting means comprises:
   means responsive to maximum value detection by said detecting means for incrementally adjusting the gain of said amplifying means until the digitized follower level reaches a predetermined proportion of the maximum digital value of said digitizing means.

6. In a scanning system having a source of illumination for an area being scanned, scanning means for generating a video signal representative of light reflected from the scan area, means for amplifying the video signal and means for processing the amplified video signal, apparatus for calibrating the illumination source and the amplifying means to maximize the video signal range, said apparatus comprising:
   scanning calibration means for controlling the exposure of said scanning means to reflected light from the scan area in order to adjust the video signal from said scanning means relative to the saturation point of said scanning means;
   gain calibration means for controlling the gain of said amplifying means to adjust the amplified video signal relative to the maximum signal range of said processing means.

7. The apparatus of claim 6 wherein said scanning calibration means comprises:
   means for increasing the light energy detected by said scanning means to a point where said scanning means saturates;
   means for adjusting the level of light energy detected by said scanning means to a predetermined point relative to the saturation point of said scanning means.

8. The apparatus of claim 7 wherein:
   said increasing means increments the light intensity of the illumination source;
   said adjusting means sets the light intensity of the illumination source such that the video signal level is a predetermined percentage of the video signal level when said scanning means is saturated.

9. The apparatus of claim 8 and in addition:
   limit means for detecting when the illumination source is at maximum intensity and said scanning means has not saturated;
   means responsive to said limit means for changing the time interval that said scanning means is exposed to the reflected light before said scanning means generates the video signal.

10. The apparatus of claim 7 wherein said gain calibration means comprises:
means for increasing the gain of said amplifying means until the amplified video signal reaches a point where the signal range of said processing means is just exceeded;
means for adjusting the gain of said amplifying means to set the level of the amplified video signal to a predetermined point relative to the point where the signal range of said processing means is just exceeded.

11. Apparatus for calibrating a linear image sensor having photosensitive cells and a CCD analog shift register, said apparatus comprising:
means for illuminating the area to be scanned;
means for adjusting said illumination means;
means for amplifying the signal generated by the sensor;
means for digitizing the amplified signal,
means for sampling the digitized value of the signal generated by the sensor during a time interval when the digitized value will be significant only if the CCD shift register has saturated;
processor means connected to said sampling means for comparing the digitized value during the saturation sample to a saturation threshold value;
said processor means controlling said adjusting means to increment the illumination provided by said illumination means until the digitized value of the saturation sample exceeds the saturation threshold indicating the CCD analog shift register has saturated;
said processor means responsive to register saturation to control said adjusting means to set the illumination at a predetermined illumination operating point relative to the illumination level that produced saturation of the CCD analog shift registers.

12. The apparatus of claim 11 wherein:
said processor means responsive to register saturation to increment said illumination adjusting means in a first direction until said processor means detects the digital value has crossed over an operating point value indicative of the illumination operating point;
said processor means responsive to the first crossover to increment said illumination adjusting means in the reverse direction until said processor means detects the digital value has crossed over the illumination operating point value a second time;
said processor means selecting the illumination setting that produced the digital value nearest the illumination operating point value during the two crossovers.

13. The apparatus of claim 11 and in addition:
means for reading from said digitizing means into said processor means the digital value of the amplified maximum signal generated by the sensor during each linear scan of the area illuminated;
means for adjusting the gain of said amplifying means;
said processor means controlling said gain adjusting means to increment the gain of said amplifying means until the digital value indicates the amplified maximum signal has been converted into the maximum digital value available from said digitizing means;
said processor means responsive to the maximum digital value to control said gain adjusting means to set the gain at a predetermined gain operating point relative to the gain setting where the amplified maximum signal was converted into the maximum digital value.

14. the apparatus of claim 14 wherein:
said processor means responsive to the maximum digital value to increment said gain adjusting means in a first direction until said processor means detects the digital value has crossed over a gain operating point value indicative of the gain operating point;
said processor means responsive to the first crossover to increment said gain adjusting means in the reverse direction until said processor means detects the digital value has crossed over the gain operating point value a second time;
said processor means selecting the gain setting that produced the digital value nearest the gain operating point value during the two crossovers.

15. Method for optimizing a scanner and its video channel to maximize the useable signal produced by the scanner through the channel, said method comprising the steps of:
calibrating the illumination used with the scanner to an operating point having a predetermined relationship to the saturation point of the scanner;
calibrating the gain through the video channel to an operating point having a predetermined relationship to the maximum signal range of the video channel.

16. The method of claim 14 wherein said illumination calibration step comprises the steps of:
setting the illumination device used with the scanner to a point where the scanner saturates;
adjusting the illumination device used with the scanner to a predetermined point relative to the scanner saturation point.

17. The method of claim 15 wherein said gain calibration step comprises the steps of:
setting the gain through the video channel to a point where the channel signal range is just exceeded;
adjusting the gain through the video channel to a predetermined point relative to the point where the channel signal range is just exceeded.

18. Method for maximizing the useable video signal available from a scanning system having an illumination device, a scanner array and a video channel for processing the signal from the array, said method comprising the steps of:
setting the illumination exposure of the scanner array to a point where the scanner array saturates;
setting the gain through the video channel to a point where the channel signal range is just exceeded;
adjusting the illumination exposure of the scanner array so that the maximum video signal through the channel is coarsely adjusted near to a predetermined operating point relative to the array saturation point;
adjusting the gain through the video channel to fine tune the maximum video signal to the predetermined operating point relative to the array saturation point.

19. The method of claim 18 wherein the illumination exposure is set and adjusted by the steps of:
setting the illumination device used in the scanning system to a point where the scanner array saturates;

adjusting the illumination device used with the scanner so that the maximum video signal through the channel is coarsely adjusted near to the predetermined operating point relative to the array saturation point.

20. The method of claim 18 wherein the illumination exposure is set and adjusted by the steps of:

increasing the exposure time interval for the scanner array to a point where the scanner array saturates;

adjusting the exposure time interval so that the maximum video signal through the channel is coarsely adjusted near to the predetermined operating point relative to the array saturation point.

* * * * *

UNITED STATES PATENT AND TRADEMARK OFFICE
CERTIFICATE OF CORRECTION

PATENT NO. : 4,408,231
DATED : October 4, 1983
INVENTOR(S) : K. A. Bushaw et al.

It is certified that error appears in the above—identified patent and that said Letters Patent is hereby corrected as shown below:

Column 15, line 51, delete "exists" and insert --exits--.

Claim 14, first line, delete "14" and insert --13--.

Signed and Sealed this

Twenty-sixth Day of June 1984

[SEAL]

Attest:

GERALD J. MOSSINGHOFF

Attesting Officer  Commissioner of Patents and Trademarks